United States Patent [19]

Jaw

[11] Patent Number: 4,844,260
[45] Date of Patent: Jul. 4, 1989

[54] COMPUTER DISC PACKING BOX
[75] Inventor: Wewi Shyan Jaw, Taipei, Taiwan
[73] Assignee: Yow Yeh Plastic Co., Ltd., Taipei, Taiwan
[21] Appl. No.: 227,312
[22] Filed: Aug. 2, 1988
[51] Int. Cl.⁴ ............................................. B65D 85/30
[52] U.S. Cl. .................................... 206/444; 206/311; 206/472
[58] Field of Search ........................ 206/444, 311, 472
[56] References Cited
U.S. PATENT DOCUMENTS
4,629,067 12/1986 Pavlik et al. .................... 206/444 X Primary Examiner—Allen M. Ostrager
Attorney, Agent, or Firm—Holman & Stern, Chartered

[57] ABSTRACT

The present invention relates to a computer disc packing box and particularly to such a novel computer disc packing box comprising two pivotally-jointed seats, a plurality of disc storage bags, upper and lower covers and two cover plates, which is characterized by the following design: the grooves on the inner sides of said two opposite pivotally-jointed seats are arranged in a fan-stage stage in keeping with the inserting legs on the two sides of bottom edge of said disc storage bags for pivotal joint between said two pivotally-jointed seats, the upper and lower covers are pivotally jointed on the two ends of bottom edge of outer sides of said pivotally-jointed seats, and the cover plates with posts are fixed on the outer sides of said pivotally-jointed seats so that the upper and lower covers can be aligned and spread and that the disc storage bags also can be aligned between said pivotally-jointed seats or automatically spread in a state of fan arrangement.

2 Claims, 7 Drawing Sheets

COMPUTER DISC PACKING BOX

REFERENCES CITED

U.S. Pat. Nos.:
821,019, May 1906, Cooke, Jr., 206/425;
1,186,312, June 1916, Hanselmann, 206/311;
1,459,457, June 1923, Wilburger, 206/311;
2,463,450, Mar. 1949, Wisner, 206/311;
4,538,730, Sept. 1985, Wu, 206/44B;
Ser. No. 095,026, Sept. 1987, Lay, ALLOWABLE.
Foreign Patent Document Nos.:
0642651, Sept. 1928, France, 206/311;
1194784, Nov. 1959, France, 206/311;
0132812, Apr. 1929, Germany, 206/311;
0022973, June 1948, Finland, 211/40;
0125897, May 1919, G.Britain, 206/311.

OTHER REFERENCE

Ser. No. 095,026 Sept. 1987 Lay, The improved Structure for laser disc storage container, 9 pages of specification and 4 Figures of drawings.

So far as the structural type of computer disc storage bag is concerned, the conventional computer disc packing box may be generally classified into two types: book type and fan type wherein the book type is quite inconvenient to place the disc therein or to take the disc therefrom since the storage bags are overlapped therein, the user has to turn open it and waste time to dispose, take and look for the disc. In order to eliminate such drawback of using it, a fan type packing box structure was developed: as soon as the cover is opened, the disc storage bags therein automatically spread, it is quite convenient to dispose the disc therein or to take the disc therefrom. In contrast, it has improved the computer disc packing box of book type. Nevertheless, in order to keep the spread of said fan disc storage bags, the box has to have elastic element in the form of cord, strip or through the zigzag joint on the two side edges of said bags, and the strong elastic force of said element has to be overcome when opening or closing the box, which is rather painstaking for the user. Furthermore, in order to keep the disc storage bags in a spread state by making use of the eleastic strip, the pressure action of said elastic strip when closing the box might damage the disc to cause a sense of insecurity in use.

In view of the foregoing drawback of fan type box, the present invention has been developed to improve the structure thereof to offer a novel structure of computer disc packing box wherein the disc storage bags are spread by making use of the natural gravity so as to eliminate the drawback of elastic action and to keep the advantage of spreading these bags.

Concretely speaking, the primary object of the present invention is to offer an inventive computer disc packing box which is characterized by the following design: the box is provided with two opposite pivotally-jointed seats and each of two opposite inner sides of these seats are provided with fan-stage grooves which are designed to pivotally joint the disc storage bags, so when opening the box, these bags can naturally form a fan spread through the fan-stage grooves and their own gravity, which is quite convenient to dispose the disc therein or to take same there-from without any elastic action, and quite easy to open and close the box with a desirable performance.

SUMMARY OF THE INVENTION

A computer disc packing box which is characterized by the following novel design: two opposite pivotally-jointed seats are provided with the fan-stage grooves on the inner sides of these seats in keeping with the pivotally-jointed disc storage bags which can naturally form a spread form through their own gravity and it is quite convenient to dispose these bags therein or to take same therefrom; in addition, the upper and lower covers of pivotally-jointed box on the outer sides of said seats easily constitute an integral box withour any elastic element so that all to do is to snap it when opening or closing it; in view of the above, it is very easy and convenient to use it without worrying about any damage of disc caused thereby and very safe without any drawback of elastic fatigue, therefore, the life expectancy of said box may be considerably extended.

DETAILED DESCRIPTION

Figure 1:
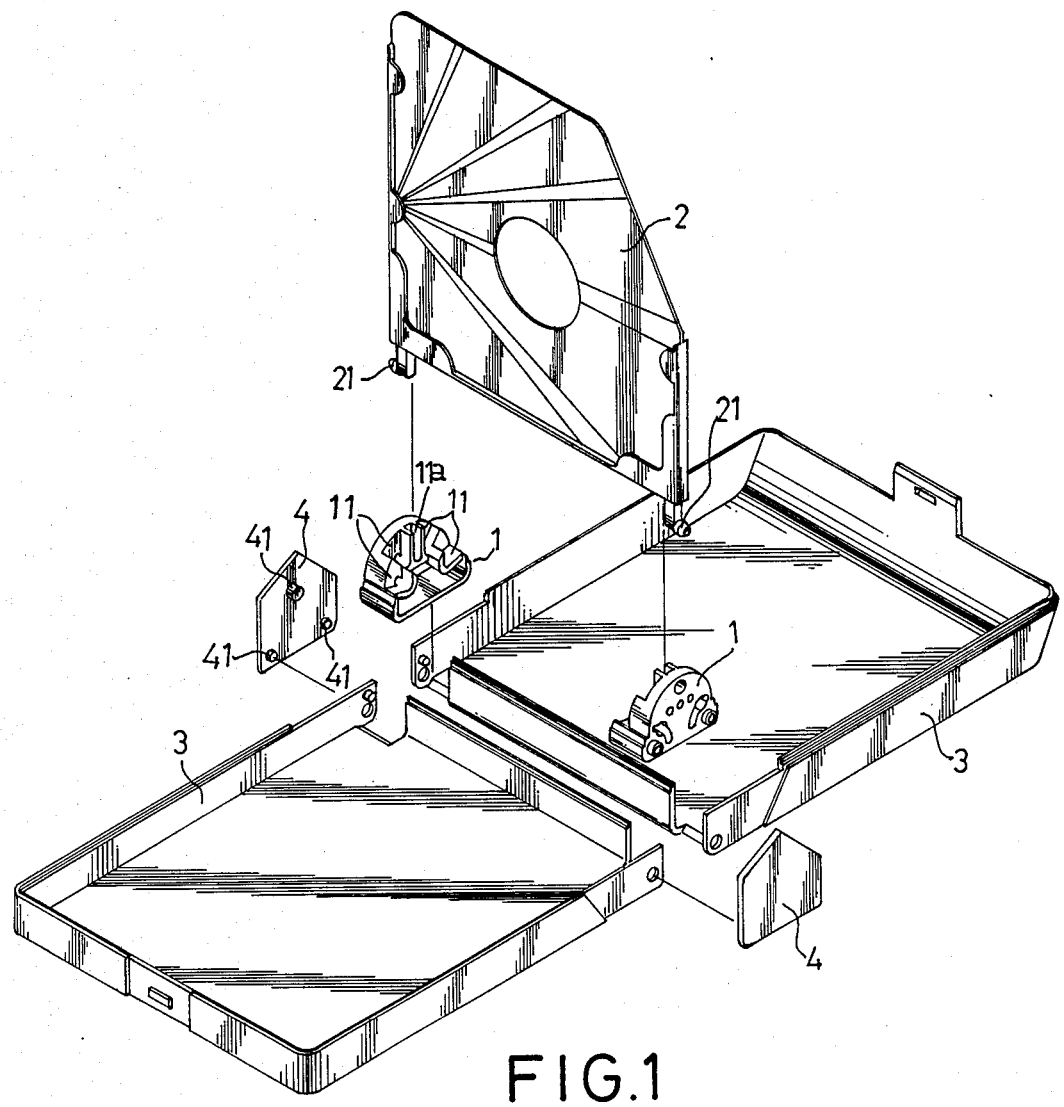
FIG. 1 is an exploded, elevational and perspective view of the present invention.

The structure of computer disc packing box of the present invention, as shown in FIG. 1, consists of two pivotally-jointed seats (1), a plurality of disc storage bags (2), upper and lower box covers (3) and two cover plates (4), wherein the two pivotally-jointed seats (1) are disposed opposite to each other, each of two opposite inner sides thereof is provided with pivotally-jointed grooves (11) in which the inserting legs (21) on the two sides on the bottom edge of disc storage bag (2) may be inserted, the upper and lower box covers (3) are pivotally jointed with the two ends on the bottom edge on the outer sides of the pivotally-jointed seats (1) to close and open the said box respectively, the two cover plates (4) with posts (41) are inserted in the slots (12) on the outer sides of pivotally-jointed seat (1) for the decoration and maintenance of said pivotally-jointed box covers (3).

Figure 2:
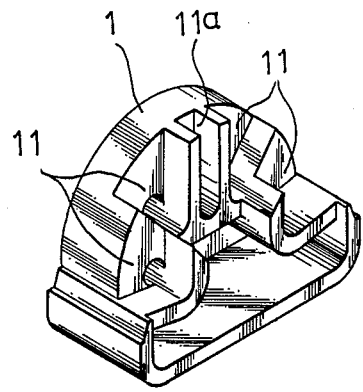
FIG. 2 is an elevational and perspective view of pivotally-jointed seats of the present invention.
Figure 3:
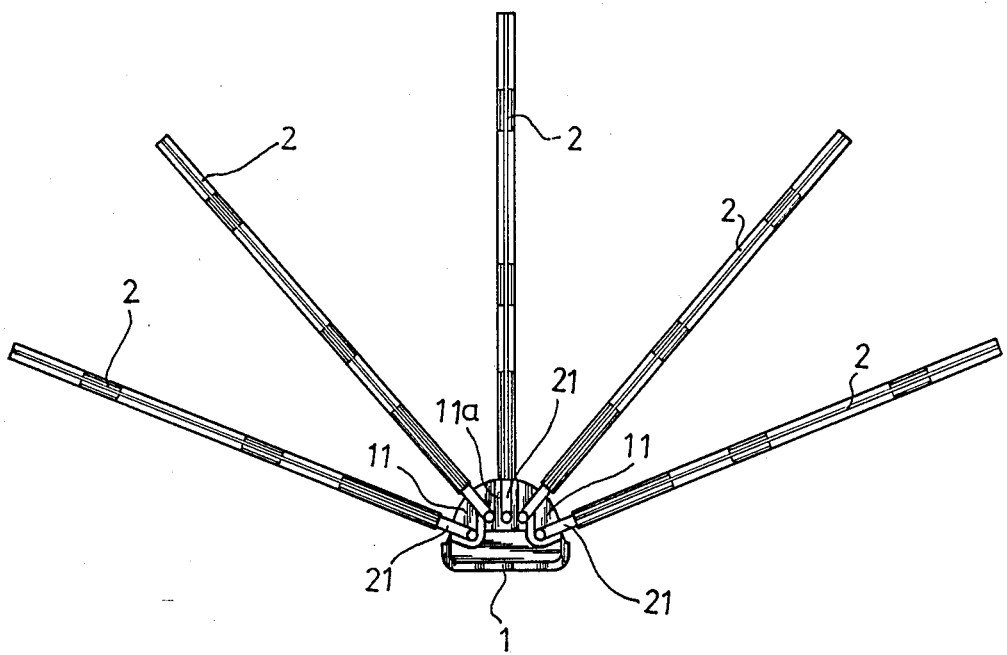
FIG. 3 is a front view of pivotally-jointed grooves on the pivotally-jointed seats of the present invention.

When the box of the present invention is open and the upper and lower box covers (3) spread left and right, since the pivotally-jointed grooves (11) on the pivotally-jointed seats (1) are arranged in a fan-stage state as shown in FIG. 2 wherein the central pivotally-jointed groove (11a) is upright to clip a disc storage bag (2), and other grooves (11) on both sides of the central groove (11a) are arranged in a state of symmetrical arc-stage to form an integral fan-stage arrangement, through which the disc storage bags (2) pivotally-jointed in these grooves (11) can, by virtue of their own gravity, naturally spread from the center toward two sides to lean against the edge of stage of said grooves (11) as shown in FIG. 3. Such a sector spread is quite convenient to dispose, take or look for the discs in need of no any other operation of turning open to watch them.

Figure 4:
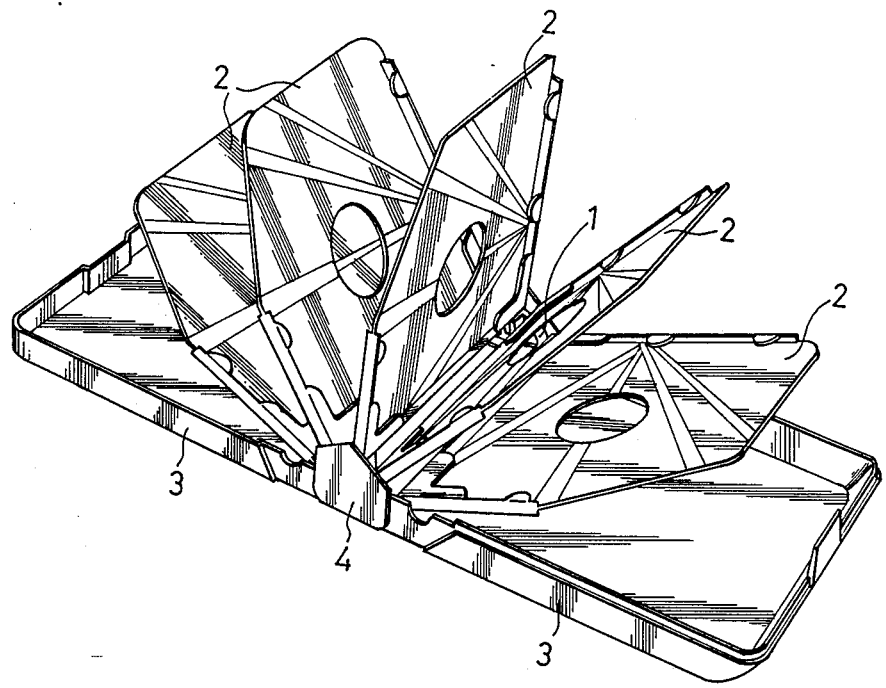
FIG. 4 is an elevational and perspective view of deployed assembly of the present invention.
Figure 5:
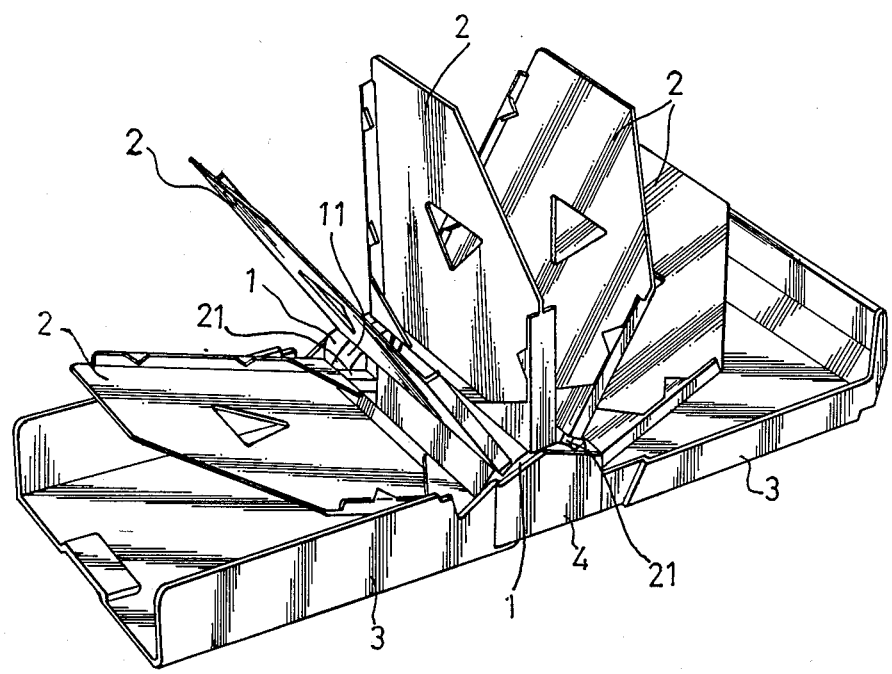
FIG. 5 is an elevational and perspective view of deployed assembly of the example of the present invention.
Figure 6:
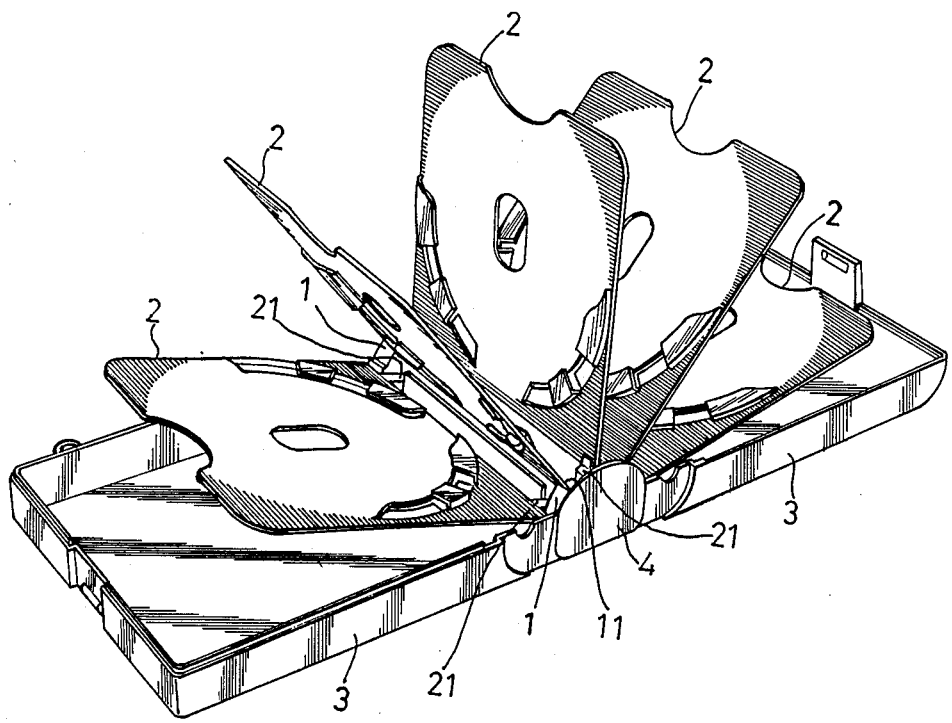
FIG. 6 is an elevational and perspective view of deployed assembly of another example of the present invention.
Figure 7:
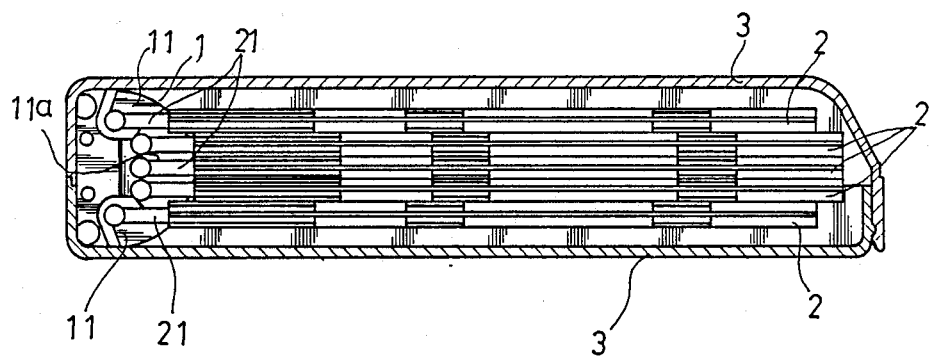
FIG. 7 is a sectional view of box assembly of the present invention.

FIG. 4 is an elevational and perspective view of spread assembly of the present invention which is very convenient to use this subject matter. FIG. 4 shows only one example of the present invention. In keeping with the storage of other articles such as other types of disc (as shown in FIG. 5) and CD (compact disc) record (as shown in FIG. 6), different types of storage bags (2) may be used: all to do is to provide the inserting legs (21) on the two sides of bottom edge of the bag to be inserted conveniently and jointed pivotally in the pivotally-jointed grooves (11) of pivotally-jointed seats (1) for same natural spread in a fan form to achieve the desirable purpose. Since the integral structure thereof requires no any elastic element, the storage bags (2) can naturally spread along with turning open the case covers (3). It is also quite convenient to open the box covers (3): all to do is to let them joint each other. When the box covers (3) are closed, the disc storage bag (2) also can insert in the pivotally-jointed groove (11) on the pivotally-jointed seat (1) as shown in FIG. 7. Since no elastic stainless steel strip is provided to the disc storage bag (2), the disc stored in the storage bag (2) will not be damaged and the box (1) as a whole will not be unserviceable because of the ineffectiveness of elastic element having been used for an undue period of time. The present invention has practical value for its durability and convenient and easy operation.

In view of the above, the structure of computer disc packing box of the present invention is really a novel and creative design without any elastic element and capable of automatic spread through the gravity of disc storage bag with desirable performance.

I claim:

1. A computer disc packing box comprising two pivot-jointed seats, a plurality of disc storage bags, upper and lower box covers and two cover plates which is characterized by the following design: the two pivotally-jointed seats are disposed opposite to each other, the pivotally-jointed grooves are provided to the opposite inner sides of said seats, the inserting legs on the two sides of bottom edge of disc storage bags may be inserted pivotally between two pivotally-jointed seats, the upper and lower box covers are pivotally jointed on the two ends of bottom edge of outer sides of the pivotally-jointed seats and then pivotally jointed on the slots on the outer sides of said pivotally-jointed seats through the posts on the two cover plates so that the covers can be mutually aligned and spread and that the disc storage bags pivotally jointed between said pivotally-jointed seats can be aligned and spread as a fan arrangement in favor of disposing and taking the disc.

2. The compmuter disc packing box pivotally-jointed seats of as claimed in claim 1 which is characterized by the following design: the grooves on their inner sides for pivotal joint are arranged in the shape of fan stage, wherein the central groove is upright to directly clip the disc storage bag, the other grooves are arranged in a symmetrical and arc stage on the two sides of the central groove so that the disc storage bags pivotally-jointed in these grooves may be mutually aligned or automatically spread to lean against the edges of stages of said grooves in a fan state through their own gravity.

* * * * *